United States Patent
Florenz et al.

(10) Patent No.: US 6,766,687 B2
(45) Date of Patent: Jul. 27, 2004

(54) DEVICE FOR DETERMINING THE LEVEL OF A MEDIUM IN A CONTAINER

(75) Inventors: Hans-Jörg Florenz, Maulburg (DE); Armin Wernet, Rheinfelden (DE)

(73) Assignee: Endress & Hauser GmbH & Co. KG (DE)

(*) Notice: Subject to any disclaimer, the term of this patent is extended or adjusted under 35 U.S.C. 154(b) by 0 days.

(21) Appl. No.: 10/203,622
(22) PCT Filed: Feb. 9, 2001
(86) PCT No.: PCT/EP01/01439
§ 371 (c)(1), (2), (4) Date: Jan. 16, 2003
(87) PCT Pub. No.: WO01/61286
PCT Pub. Date: Aug. 23, 2001

(65) Prior Publication Data
US 2003/0192380 A1 Oct. 16, 2003

(30) Foreign Application Priority Data
Feb. 17, 2000 (DE) .................... 100 07 188

(51) Int. Cl.[7] ............................................. G01F 23/00
(52) U.S. Cl. ............................................. 73/304 C
(58) Field of Search .................................. 73/304 C

(56) References Cited

U.S. PATENT DOCUMENTS

| | | | | |
|---|---|---|---|---|
| 3,199,350 A | | 8/1965 | Schubring | |
| 3,367,183 A | * | 2/1968 | Webster | 73/304 C |
| 3,862,571 A | * | 1/1975 | Vogel | 73/304 C |
| 4,497,204 A | * | 2/1985 | Kobayashi | 73/304 C |
| 4,499,767 A | * | 2/1985 | Fathauer et al. | 73/304 C |
| 4,806,847 A | * | 2/1989 | Atherton et al. | 73/304 C |
| 5,602,333 A | | 2/1997 | Larrabee et al. | |

* cited by examiner

Primary Examiner—Hezron Williams
Assistant Examiner—Katina Wilson
(74) Attorney, Agent, or Firm—Bacon & Thomas, PLLC; Felix J. D'Ambrosio

(57) ABSTRACT

The invention relates to a device for determining the level (F) of a medium (3) in a container (2) using a capacitive sensor (4). A voltage source which subjects the sensor (4) to a measuring frequency ($f_M$) is provided, as is a measuring/evaluating circuit (6) which establishes the measured capacitance ($C_M$), compares this to a predetermined capacitance value and provides the information concerning the level (F) of the medium (3) in the container (2). The aim of the invention is to increase the measuring sensitivity of a capacitive sensor (4) without increasing the sensitivity of the sensor to interfering signals. To this end, the measuring/evaluating circuit (6) has at least one inductance (L) which together with the measured capacitance ($C_M$), forms a resonant circuit (7).

10 Claims, 2 Drawing Sheets

DEVICE FOR DETERMINING THE LEVEL OF A MEDIUM IN A CONTAINER

FIELD OF THE INVENTION

The invention relates to a device for determining the level of a medium in a container by means of a capacitive sensor, wherein a voltage source is provided, which subjects the sensor to a measuring frequency, wherein a measuring/evaluating circuit is provided, which ascertains the measured capacitance and compares it with a predetermined capacitance and furnishes the information about the level of the medium in the container.

BACKGROUND OF THE INVENTION

In capacitive methods for determining the level of a product in a container, the capacitive sensor and container wall form the electrodes of a capacitor. If the container wall is not conductive, then a separate electrode must be provided, inside or outside the container. Between the two electrodes—depending on the level of the medium in the container—there is either air or the medium, which because of the different dielectric constants of the two substances is expressed as a change in the measured capacitance. Naturally, the measured capacitance is also dependent on the fill level of the medium in the container at the time, since the variables called "level" and "measured capacitance" both depend functionally on one another. Capacitive sensors can therefore be used both in limit state detection and in continuous level determination.

From German Patent DE 195 36 199 C2, a capacitive level sensor has been disclosed that is mounted at the height of the level to be monitored. In other words, it is a limit state detector, or limit switch. Limit switches are preferentially mounted as overflow suppressors in containers or as means of securing pumps against running empty. If the capacitive sensor is covered by the particular product to be detected, then it has a higher capacitance than in the uncovered state. By means of a capacitance measuring circuit and a comparator, the measured capacitance is compared with a threshold value; from the outcome, it is clearly detectable when the level to be monitored has been reached.

The level measurement by means of capacitive sensors is critical in the sense that the capacitances to be determined and evaluated are on the order of magnitude of 1 pF. In compact limit switches, the relevant capacitances are even less than 1 pF. These very low measurement values are furthermore, in many cases, adulterated by external interference variables. The interference variables involve electromagnetic interference signals, for instance, deposit formation on the sensor, or temperature drift and long-term drifting of the measuring/evaluating circuit.

SUMMARY OF THE INVENTION

The object of the invention is to increase the measurement sensitivity of a capacitive sensor and at the same time lessen its sensitivity to interference signals.

This object is attained in that the measuring/evaluating circuit has at least one inductor, which with the measured capacitance forms a series resonant oscillating circuit.

In an advantageous refinement of the device of the invention, the device is a limit state detector, or a limit switch. It is understood, however, that the invention can also be employed in conjunction with a continuous level measurement; in the case of that application, a linearization should subsequently be performed. Preferably—but without any corresponding limitation—the device of the invention is embodied as a compact sensor.

An advantageous refinement of the device of the invention provides a resistor, which is connected parallel to the inductor of the measuring/evaluating circuit. This resistor serves to damp the series resonant oscillating circuit in a purposeful way.

In an advantageous refinement of the device of the invention, in addition to the measured capacitance, a second capacitor is provided, whose first terminal is connected to the node point to which the measured capacitance and the inductor are connected, and whose second terminal is connected to the internal ground of the measuring/evaluating circuit. This capacitance serves to set the operating point of the measuring/evaluating circuit.

In particular, it is provided that the resistor and the natural resonance of the inductor are dimensioned such that interfering frequencies are largely suppressed. By means of a skilled selection of the inductor, the electromagnetic compatibility behavior of the circuit can be improved substantially. It is also advantageous if the inductor and the capacitance of the second capacitor are dimensioned such that interfering frequencies are largely suppressed.

In a preferred embodiment of the method of the invention, the series resonant oscillating circuit is tuned such that at maximum measured capacitance, the measuring frequency is equal to the resonant frequency, or that the measuring frequency is less than the resonant frequency. Thus when the sensor is uncovered, or when the level of a medium with a low dielectric constant is monitored, a reduction in the total impedance made up of the measured capacitance and the inductor and thus greater sensitivity are already obtained. Since this has no effects on the measuring/evaluating circuit, the absolute temperature drift remains the same, while the relative temperature drift improves. Along with this, the sensitivity of the capacitive sensor to interference variables decreases.

An especially advantageous feature of the device of the invention proposes that the damping of the series resonant oscillating circuit by the resistor be selected such that tolerances in the natural resonance of the inductor and/or the temperature dependency of the inductor are suppressed.

BRIEF DESCRIPTION OF THE DRAWINGS

The invention will be described in further detail in conjunction with the following drawings. Shown are.

DESCRIPTION OF THE PREFERRED EMBODIMENT

Figure 1:
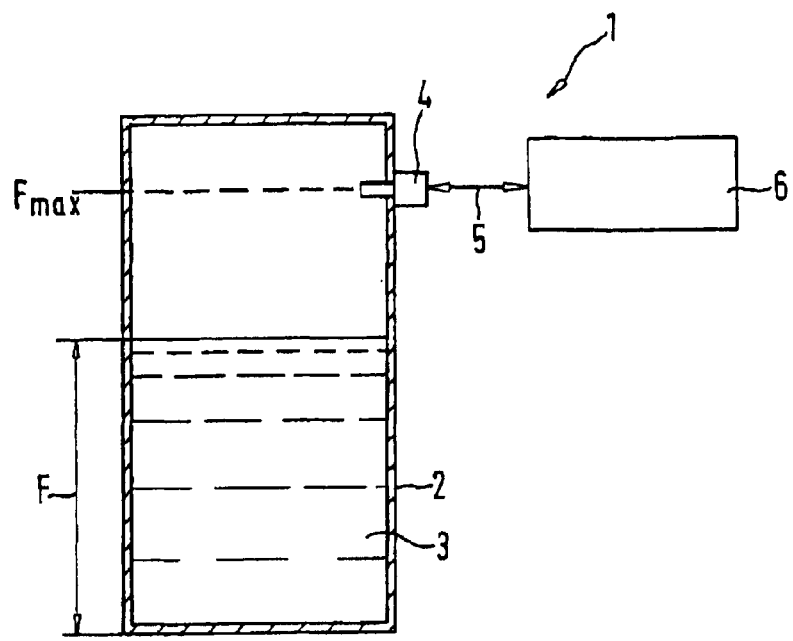
FIG. 1: which is a schematic illustration of the device of the invention.

FIG. 1 is a schematic illustration of the device 1 of the invention. The capacitive sensor 4 is disposed in the upper region of the container 2, to prevent overfilling, or in other words, in the case illustrated, it functions as a limit switch. The capacitive sensor 4 ascertains the measurement voltage $U_M$, that is, the measurement or apparent current $I_M$. Preferably, the device 1 of the invention employs a sinusoidal measurement voltage $U_M$ of constant measuring frequency $f_M$. The measurement voltage $U_M$ and measurement current $I_M$ vary as a function of the measured capacitance $C_M$, which—as already mentioned several times—is a measure for the level F of the medium 3 in the container 2. Via the connecting line 5, the capacitive sensor 4 is connected to measuring/evaluating circuit 6; it is quite possible for the measuring/evaluating circuit 6 instead to be disposed in the capacitive sensor 4.

Figure 2:
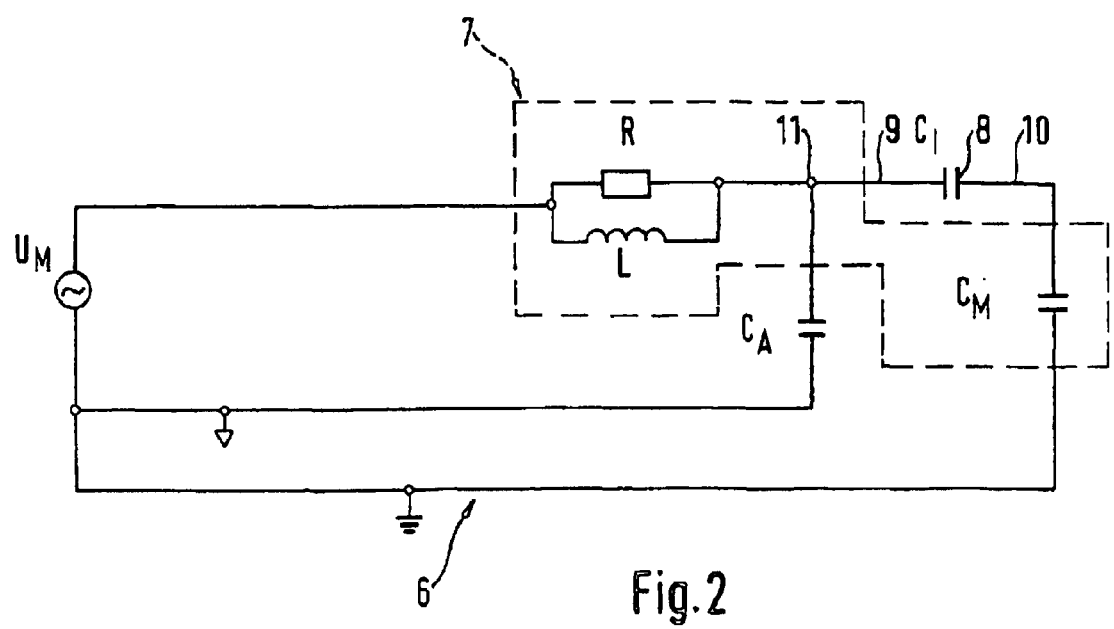
FIG. 2: which is a substitute circuit diagram of the measuring/evaluating circuit of the device of the invention.

In FIG. 2, a substitute circuit diagram of the measuring/evaluating circuit 6 of the device 1 of the invention is shown. An inductor L is connected in series with the measured capacitance $C_M$. A resistor R is connected parallel to the inductor L. The measured capacitance $C_M$, inductor L, and resistor R form a series resonant oscillating circuit 7. Every real inductor—because it is always accompanied by parasitic capacitances—acts as its own parallel oscillating circuit with its own resonant frequency or its own frequency response. By means of suitable tuning of this resonant circuit, it is therefore possible for unwanted frequency components of the interference spectrum to be largely and purposefully suppressed.

The resistor R serves to provide purposeful damping of the series resonant oscillating circuit 7. Between the parallel circuit, formed by the inductor L and resistor R, and the measured capacitance $C_M$, there is the insulation capacitor $C_1$ of the capacitive sensor 4, which is represented by the capacitor 8. A further capacitance $C_A$ is connected to the internal ground of the sensor 4 at the node point 11 of the parallel circuit comprising the inductor L and the resistor R. This capacitance $C_A$ serves to set the operating point of the measuring/evaluating circuit 6. The environment of the sensor 4 to be evaluated, that is, the container 2, the medium 3, and ground, is shown in the substitute circuit diagram in the form of the measured capacitance $C_M$ and an external return line to the internal ground of the sensor 4.

Figure 3:
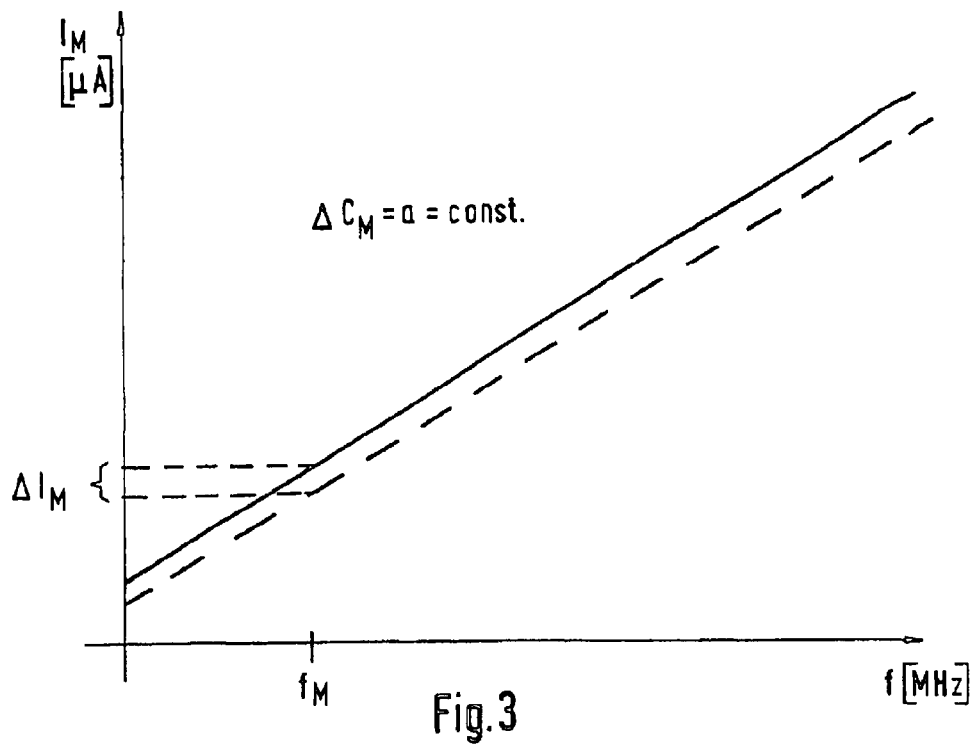
FIG. 3: which is a graph showing the frequency behavior of the measuring/evaluating circuit of the prior art.

FIG. 3 is a graph showing the frequency behavior of the measuring/evaluating circuit 6 of the prior art. In the case illustrated, a constant measuring frequency $f_M$ of 3 MHz is used. Since the series resonant oscillating circuit 7 is tuned very precisely by way of the choice of the individual components L, R, it is advantageous to keep the measuring frequency $f_M$ constant.

In the frequency response, two items are striking, in terms of the measurement accuracy of the capacitive sensor 4:

1. The change in the apparent current $I_M$ caused by the change in the measured capacitance $C_M$ is very slight. In the normal case, it is several $\mu$A.

2. The measuring current $I_M$ increases steadily, with an increasing measuring frequency $f_M$.

The disadvantage of item 1 above, as already noted there, is that the measurement sensitivity is low; the clear disadvantage of item 2 is that high-frequency interference signals additionally impair the sensitivity of the measurements.

Figure 4:
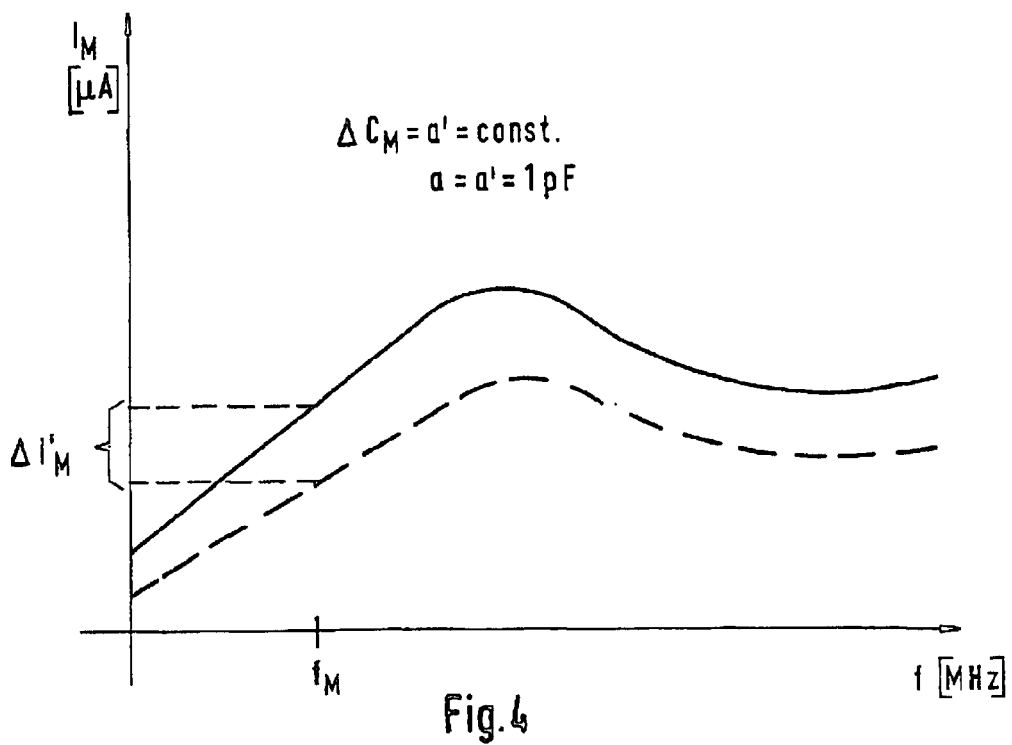
FIG. 4: which is a graph showing the frequency behavior of the measuring/evaluating circuit of the device of the invention.

FIG. 4 shows a graph illustrating the frequency behavior of the measuring/evaluating circuit 6 in the device 1 of the invention, for the same change in the measured capacitance $C_M$. It is understood that comparable capacitive sensors 4 were used in both cases. If the frequency response shown in FIG. 4 is compared with the course shown in FIG. 3, it is striking that by means of the measuring/evaluating circuit 6 used according to the invention, the aforementioned two disadvantages of the known capacitive sensors 4 are effectively counteracted.

1. The measuring sensitivity is improved considerably. As corresponding measurements confirm, the change in the measuring current $I_M$ caused by the change in the measured capacitance $C_M$ is approximately 60% greater than in the sensor 4 shown in FIG. 3.

2. The measuring current $I_M$ does not increase steadily with the frequency but instead, after a maximum is reached, drops again markedly. This means that interference signals in the higher frequency range are suppressed. Consequently, the electromagnetic compatibility behavior can be improved in a purposeful way with the device of the invention.

List of Reference Numerals

1 Device of the invention
2 Container
3 Medium
4 Capacitive sensor
5 Connecting line
6 Measuring/evaluating circuit
7 Series resonant oscillating circuit
8 Second capacitor
9 First terminal
10 Second terminal
11 Node point

What is claimed is:

1. A device for determining the level of a medium in a container, comprising:
a capacitive sensor;
a voltage source which subjects said capacitive sensor to a measuring frequency ($f_m$); and
a measuring/evaluating circuit which ascertains the measured capacitance, said measuring/evaluating circuit having at least one inductor which forms a series resonant oscillating circuit with said capacitive sensor, wherein:
said series resonant oscillating circuit is tuned such that said measuring frequency ($f_m$) is less than the resonant frequency ($f_r$) of said series resonant oscillating circuit, and
said measuring/evaluating circuit compares the ascertained measured capacitance ($C_m$) with a predetermined capacitance and furnishes information about the level of the medium in the container.

2. The device as defined in claim 1, wherein said device is a limit state detector.

3. The device as defined in claim 1, wherein said device is embodied as a compact sensor.

4. The device as defined in claim 1, further comprising:
a resistor connected parallel to said at least one inductor.

5. The device as defined in claim 4, wherein:
the resistance of said resistor and the natural resonance of said at least one inductor are dimensioned such that interfering frequencies are largely suppressed.

6. The device as defined in claim 4, wherein:
the damping of said series resonant circuit by said resistor is selected such that tolerances in the natural resonance of said at least one inductor and/or the temperature dependency of said at least one inductor is suppressed.

7. The device as defined in claim 1, further comprising:
a second capacitor of capacitance ($C_1$) having a first terminal and a second terminal, said first terminal being connected to the node point defined by the connection between said capacitive sensor and said at least one inductor, and said second terminal being connected to ground.

8. The device as defined in claim 7, wherein:
said at least one inductor and said second capacitor are dimensioned such that interfering frequencies are largely suppressed.

9. The device as defined in claim 1, wherein said measuring frequency ($f_M$) is one of: a variable or constant frequency, and in either case, is less than the resonant frequency ($f_r$).

10. The device as defined in claim 1, wherein said measuring/evaluating circuit detects changes in measuring current ($I_M$) caused by changes in the measured capacitance ($C_M$).

* * * * *